Figure 1:
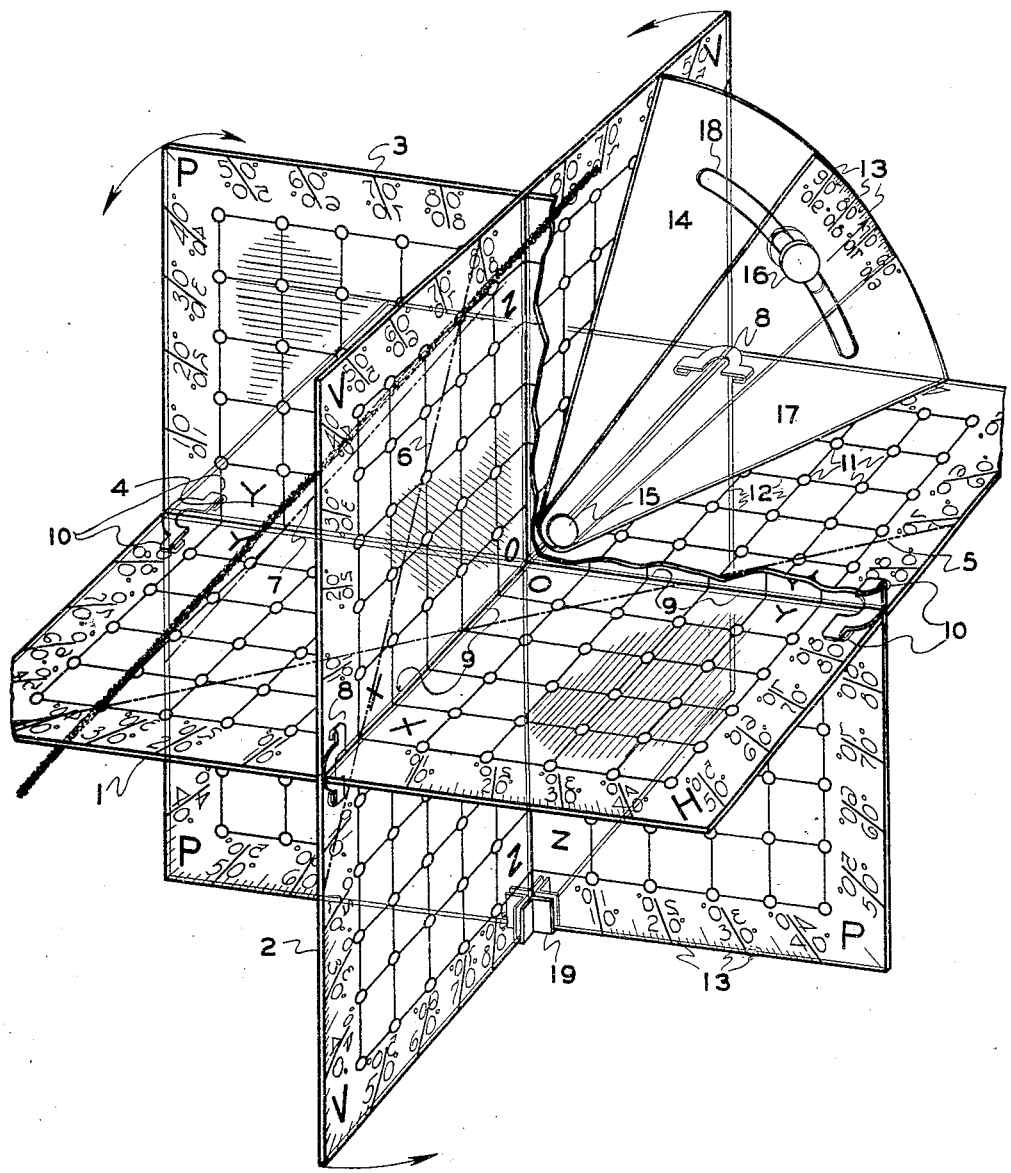

June 6, 1933.  H. M. McCULLY  1,912,380
GEOMETRICAL DEVICE
Filed June 14, 1928  2 Sheets-Sheet 1

INVENTOR
H. M. McCully

June 6, 1933.                H. M. McCULLY                1,912,380
                            GEOMETRICAL DEVICE
                       Filed June 14, 1928        2 Sheets-Sheet 2
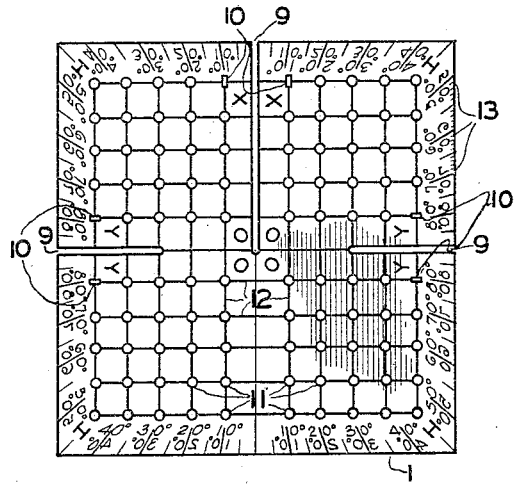
FIG. 2
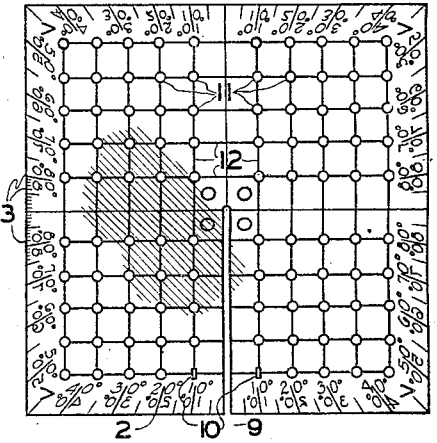
FIG. 3
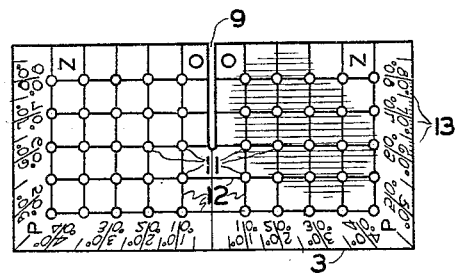
FIG. 4
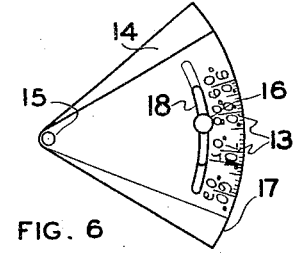
FIG. 6
FIG. 5
FIG. 9
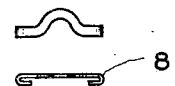
FIG. 7
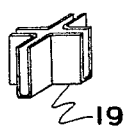
FIG. 8
INVENTOR
H. M. McCully Patented June 6, 1933

1,912,380

UNITED STATES PATENT OFFICE

HARRY M. McCULLY, OF PITTSBURGH, PENNSYLVANIA

GEOMETRICAL DEVICE

Application filed June 14, 1928. Serial No. 285,379.

In solving any problem involving spatial relations it is necessary for the student to visualize and determine the proper position of the various elements (points, lines and planes) of his problems with reference to each other and to horizontal, vertical and end or profile planes, mutually perpendicular to each other and commonly called the coordinate planes, planes of reference or plans of representation, and to determine the relation of their projections to the axis lines of these planes. Regardless of whether or not these points, lines or planes are located in front of or behind the vertical, above or below the horizontal, or to the right or left of the end or profile plane, they are considered as being viewed from a point of sight above the horizontal to the right of the profile and in front of the vertical, in the conventionally named first quadrant of space. The student must first analyze the space relationship and then determine the appearance of these points, lines or planes on the planes of representation, and finally by means of geometrical constructions with reference to the axis lines of the planes, he must determine their appearance upon a single plane or paper representing all three planes.

This invention provides a means for placing points, lines and planes in their proper geometrical relationship, either exactly or proportionally, both to each other and to the planes of reference or representation, as established by given data. It provides also a means for seeing and determining the appearance of points, lines and planes upon the co-ordinate planes, planes of reference or planes of representation when viewed from the commonly assumed point of sight in the first quadrant, regardless of whether or not the points, lines or planes be located in front of or behind the vertical, above or below the horizontal, or to the right or left of the end or profile plane. It further enables the student, by bringing the planes into co-incidence about their common lines or axis lines, to determine the appearance of the representation of these points, lines or planes when shown upon a single plane and with reference to these axis lines.

In the accompanying drawings I have shown a present preferred embodiment of the invention in which, Figure 1 is a perspective view of a geometrical device constructed in accordance with my invention, portions thereof being cut away.

Figs. 2, 3, and 4 are plan views of portions of the device shown in Fig. 1,

Fig. 5 is a plan view of a specially prepared wire adapted to be used with my geometrical device, Fig. 6 is a plan view of an angle measuring device, Fig. 7 is an elevational view of a fastening means, Fig. 8 is a perspective view of a removable supporting clip for my device, and Fig. 9 is a plan view of the fastening means shown in Fig. 7.

In the accompanying diagrams or drawings, Figure 1 is a general drawing of the device in which items 1, 2, and 3, and item 1, Figure 2; item 2, Figure 3; and item 3, Figure 4; show the reference planes, co-ordinate planes or planes of representation, which are made of tinted transparent material, upon which lines may be drawn, and which permit the student to see clearly from a point of sight in the first quadrant, above the horizontal, to the right of the profile and in front of the vertical planes, into all the divisions of space formed about the intersection of these three planes at their axis lines; Figure 5, a wire similar to a pipe stem cleaner, Figure 6, a collapsible plane, Figure 7, a fastening clip, and Figure 8, a supporting device.

Upon each of planes 1, 2, and 3, I then provide a system of rule co-ordinate lines, item 12, which may be printed in ink of various colors, one color to a plane, and by means of which the position of a point may be determined with reference to these three planes. By means of these co-ordinate rulings, the graphic representation of a point on any of the planes may be located, and the position of its representation on that plane with reference to the axis lines of the planes determined.

I also provide a series of holes, item 11 of

Figures 1, 2, 3, and 4, symmetrically arranged at the intersection of the co-ordinate rulings through which a specially prepared wire, item 4 of Figure 1 and Figure 5, of the same material or similar to that used as pipe stem cleaners, and simulating a line in space, may be inserted and retained in position to permit the student to determine its relationship to the planes of reference or representation, items 1, 2 and 3 of Figures 1, 2, 3 and 4. By following the co-ordinate rulings from the points at which this wire passes through the planes, item 12 of Figures 1, 2, 3, and 4, the student may determine the appearance and draw the representation of the line on the co-ordinate planes as shown by items 5, 6 and 7 of Figure 1. By means of a series of graduations in degrees of arc, item 13 of Figure 1, arranged in a new and novel manner, one scale to be readable, when printed upon one and the same side of the plane, from any position about the point O, common to the intersections of the three reference planes, the inclination of the graphic representation of the line to the axis lines, OX, OY and OZ, of the reference or co-ordinate planes may be determined.

I further furnish an arrangement of tinted, transparent segments, items 14 and 17 of Figures 1 and 6, held together by a compression eyelet, item 15 of Figures 1 and 6, and a compression clip, item 16 of Figures 1 and 6 engaging through a slot, item 18 of Figures 1 and 6, in such fashion that the angle included between the edges of the two segments may be varied; the whole arranged to simulate various positions of a plane in space oblique to the reference or co-ordinate planes, and by means of which the lines of intersection of such planes and the position of such planes with reference to the co-ordinate planes or planes of representation may be determined. By means of the graduations, item 13 of Figures 1, 2, 3, and 4 the geometrical relation of the lines of intersection of such planes with the axis lines of the co-ordinate planes or planes of reference may be established or measured.

Further, the appearance upon or position with reference to the co-ordinate planes of any surface lying in, or any solid having its base in, such an oblique plane, items 14 and 17 of Figures 1 and 6 may be established and determined by drawing such figures upon or placing such solids upon this oblique plane.

By means of slots, item 9 of Figures 2, 3, and 4; clips, item 8 of Figures 1 and 7; and holes, item 10 of Figures 1, 2, and 3 I hinge or join the planes, items 1, 2, and 3 of Figures 1, 2, 3, and 4 in such a manner that two planes may be rotated or revolved into co-incidence, as indicated by arrows attached to item 3 of Figure 1, and the third plane may then be rotated or revolved into co-incidence with the first two as indicated by the arrows attached to item 2 of Figure 1. By this process the appearance on a flat paper of problems constructed by geometrical rules and in their nature similar to those outlined in the preceeding specifications and illustrated in the accompanying drawings may be determined mechanically. For the purpose of maintaining the planes in fixed position for studying fixed spatial relations, I furnish a removable supporting clip, item 19 of Figures 1 and 8.

The word "graduations" as used in certain of the claims is to be interpreted as a word of definition and not of limitation, it being intended that such word shall comprehend broadly not only lines or marks drawn on the sheets, but also lines scored in the sheets, indentations in the sheets, or perforations through the sheets.

While I have shown and described a present preferred embodiment of the invention, it is to be understood that the same is not limited thereto but may be otherwise embodied within the scope of the following claims.

I claim:

1. The combination of three transparent sheets connected so that they may be relatively positioned to show the three planes of reference or representation and to permit visibility in all quadrants of space, and a removable supporting clip to hold such sheets in fixed position when desired.

2. The combination of transparent sheets connected so as to be positioned angularly to one another provided with a system of co-ordinate rulings, and holes located at the intersections of these co-ordinate rulings which will permit the establishment of various elements of geometrical problems in their proper positions with reference to each other and the planes of reference or co-ordinate planes of geometry or the axis lines of such planes.

3. A device of the class described, comprising a plurality of intersecting transparent sheets at least one of which has graduations thereon, and means fastened to at least one of the sheets for maintaining the sheets in intersecting relationship while permitting relative angular displacement thereof.

4. A device of the class described, comprising a plurality of intersecting slotted sheets, and means extending across the slots to maintain the sheets in intersecting relationship while permitting relative angular displacement thereof.

5. A device of the class described, comprising transparent means having graduations thereon and having indices cooperating with the graduations and readable from left to right from either side of the device.

6. A device of the class described, comprising a transparent member having indicating means thereon and having indicia applied to on side thereof and readable from left to right from the same side and having indicia applied to the same side of the member and readable from left to right from the other side.

7. A device of the class described, comprising a ruled transparent sheet having indicia applied to the respective rulings on one side of the sheet and readable from left to right from the same side thereof and having indicia applied to the same side of the sheet and readable from left to right from the other side.

8. A device of the class described, comprising a plurality of collapsibly connected sheets the material of which is pervious to light, said sheets being adapted to assume positions at an angle to one another and to be collapsed approximately into a common plane, at least one of said sheets being provided with graduations.

9. A device of the class described, comprising three sheets of material pervious to light, said sheets being collapsibly connected and adapted to assume positions in which their planes intersect and to be collapsed approximately into a common plane.

10. A device of the class described, comprising a plurality of sheets of material pervious to light, said sheets being collapsibly connected and adapted to assume positions in which their planes intersect and to be collapsed approximately into a common plane, at least one of said sheets having holes therein to serve as fastening means.

11. A device of the class described, comprising a plurality of sheets of celluloid at least one of which is provided with graduations, said sheets being collapsibly connected and adapted to assume positions in which their planes intersect and to be collapsed approximately into a common plane.

HARRY M. McCULLY.